Sept. 5, 1939.   F. L. LANGHAMMER   2,172,309
HOSE SUPPORTER
Filed Dec. 7, 1936
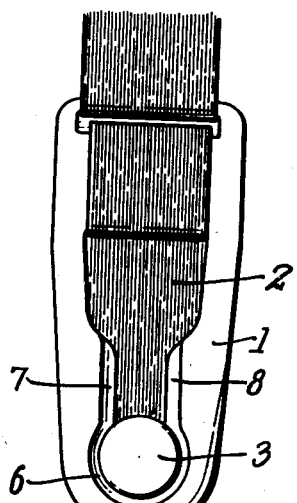
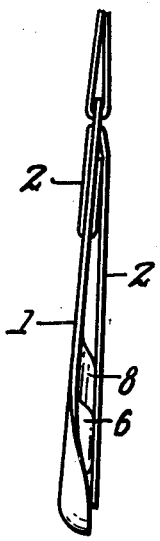
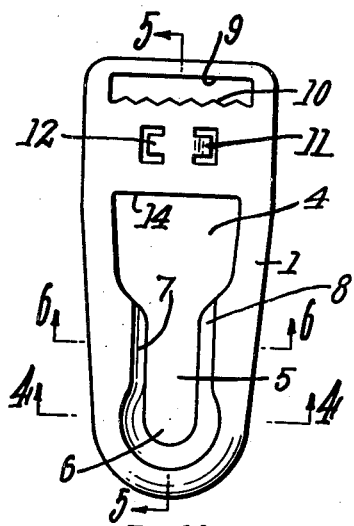
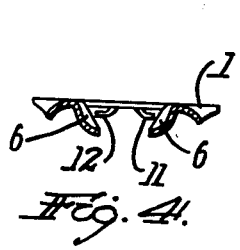
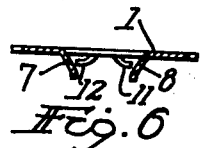
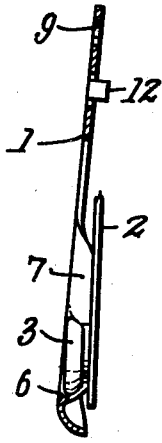
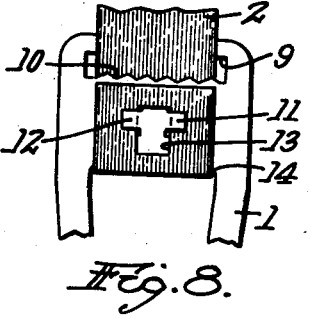
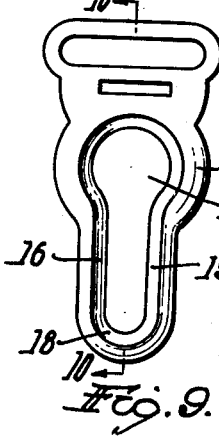
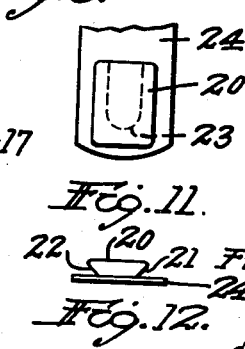
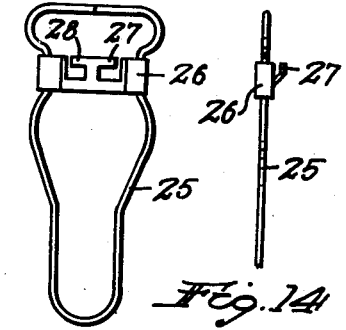
Inventor
Frank L. Langhammer
By Chas. H. Richards
Attorney Patented Sept. 5, 1939

2,172,309

UNITED STATES PATENT OFFICE 2,172,309

HOSE SUPPORTER

Frank L. Langhammer, Bridgeport, Conn., assignor to Samuel J. Agbay, Worcester, Mass.

Application December 7, 1936, Serial No. 114,580

3 Claims. (Cl. 24—245)

This invention relates to improvements in hose supporters and particularly to hose supporters that are used with corsets.

One object of this invention is to provide a simple flexible clasp member for cooperation with a loop, of any suitable material, which may be quickly and securely fastened to the said loop.

A further object of this invention is to provide a hose attaching device having a minimum thickness whereby it will be comparatively inconspicuous when worn with very thin dresses.

A further object of this invention is to provide a loop having a large gripping surface for cooperation with a clasp member so that the fabric of the hose will be gripped firmly with the least danger of tearing.

A further object of this invention is to provide a hose supporter loop with a maximum of gripping surface whereby the strains on a stocking are spread over a wide area to eliminate the chance of tearing said stocking.

A further object of this invention is to provide a hose supporter loop having a maximum of gripping surface with a clasp member having a cooperative surface whereby the said clasp member will not disengage itself when relieved of strain.

Further objects and advantages will more fully appear from the following detailed description which, taken together with the accompanying drawing, illustrate some embodiments of said invention:

Fig. 1 is enlarged front assembly view of the preferred form of the invention.

Fig. 2 is a side elevational view of Fig. 1.

Fig. 3 is a front view of the loop.

Fig. 4 is a section taken on line 4—4 of Fig. 3.

Fig. 5 is a section taken on line 5—5 of Fig. 3.

Fig. 6 is a section taken on line 6—6 of Fig. 3.

Fig. 7 is a front view of the tab member which includes the clasp member.

Fig. 8 is a view of the upper portion of the loop showing the means of attaching the tab.

Fig. 9 is a modified form of the invention.

Fig. 10 is a section taken on line 10—10 of Fig. 9.

Fig. 11 is a front view of the clasp and of the tab for use with the loop shown in Fig. 9.

Fig. 12 is an end view of Fig. 11.

Fig. 13 is a front view of a further modification of the invention.

Fig. 14 is a side view of Fig. 13.

Like reference characters refer to like parts in the different figures.

Referring first to Figs. 1 and 2 it will be noted that the assembly consists of a loop member 1 and a tab 2 which has a clasp member 3 fastened to the end thereof. As the various figures of the drawing are approximately twice the actual size of the article it will be readily seen that the assembly is very thin and will be very inconspicuous when worn under thin dresses.

In order to have a maximum of gripping surface, for holding the hose, the loop member is constructed along lines to give this very desirable effect. Referring to Figs. 3 to 6 inclusive the loop member is shown as having an aperture 4 which narrows downwardly at 5 to an enlarged bowl shaped opening 6. The sides 7 and 8, Fig. 6, of the narrow portion 5 are inclined toward each other downwardly from the outer surface to form a slide way for the clasp member 3, the sides of which are shaped to mate with the said sides 7 and 8. With this construction the sides 7 and 8 form a runway toward the bowl 6 so that when the clasp member 3 is in the said bowl it cannot disengage itself when there is no strain on it; also by having the sides converging a much closer and better fit between the loop and the clasp member is possible.

Again referring to Figs. 3 and 5, the loop member 1 has a slot 9 in the upper end thereof, the edge 10 of the said slot being serrated for the purpose which will be presently explained. Also in the upper end of the loop member 1 is means for fastening the tab to the said member comprising a pair of arms 11 and 12 which are an integral part of the loop. The arms 11 and 12 are slightly raised above the under surface of the loop member as seen in Figs. 5 and 6.

The tab 2 has an aperture 13, Figs. 7 and 8, which is slipped over the arms 11 and 12 of the loop 1 after which the said arms are pressed downwardly on the tab member to firmly lock it in position, although this is not absolutely essential. In assembling the loop 1 and tab 2 the aperture 13 is slipped over the arms 11 and 12 and then the tab is drawn over the edge 14 and the button 3, Fig. 7, is passed through the slot 9 and the tab is then brought down over the toothed edge 10. In this manner the tab covers the arms 11 and 12 so that no metal will come in contact with the body in cases where metal is used, and in any event a smooth surface is provided on the side of the hose support which is next to the body. With this manner of assembly the downward strains on the tab are all taken on its entire width and not on the upper edge of the slot so that a very substantial article is produced which cannot become disengaged unintentionally.

In Figs. 9 and 10 is to be seen a modification of this invention in which the novelty resides in the long tapering sides 15 and 16 of loop member 17. These sides are inclined toward each other and end in a semi-circular end 18 so that the taper from the top of the loop is tapering inwardly around the entire opening 19. This tapering edge when used in conjunction with a clasp member 20, Figs. 11 and 12, which has inwardly inclined sides 21 and 22, that have the same degree of inclination as the sides 15 and 16 of the loop member 17. It is to be noted that the under portion of the clasp member 20 is curved as at 23 so that it will match the semi-circular portion 18 of the loop member 17. The clasp member 20 is secured to a tab 24 which in turn is attached to the loop 17 in any suitable manner. When the clasp member 20 is inserted in the loop 17 the top of it is just slightly lower than the top of the inclined surfaces 15 and 16 so that when a stocking is placed over the clasp member and the whole inserted in the loop member it will not protrude above the surface of the member 17. The tapering sides of the loop and clasp member distribute the strains on the stocking so that danger of it being torn is eliminated. Furthermore by having angular mating sides on the loop and clasp member there is no danger of slipping due to the long continuous holding surface in contact with the stocking.

Figs. 13 and 14 show the construction of a simple wire loop member with the improved holding means for the tab. The loop 25 is held together by means of a band 26 which is crimped around the separate sides of the loop. The band has a pair of arms 27 and 28 forming a T shaped portion integral therewith on which a tab with a clasp member is suitably fastened.

From the above description it will be readily seen that a very substantial means has been provided for holding a tab to a loop without the necessity of providing special reinforcing members on the attaching end which cannot become disassociated from its loop unintentionally.

I claim:

1. Attaching means for a hose supporter comprising a rigid loop member, oppositely extending arms in the upper portion of said loop member, said member having a slot above said arms, one edge of said slot being serrated, and a clasp member having a perforate interlocking connection with said arms, said clasp member passing through said slot and over said serrated edge whereby any downward strains on said clasp member are distributed over its entire width.

2. In hose attaching means, a loop member, arms on said loop member, said member having a slot with a serrated edge above said arms, a tab, and means on said tab whereby it can be mounted under said arms and held thereby.

3. In hose attaching means, a loop member, oppositely extending arms in the upper portion of said loop member, and a clasp member having a perforate interlocking connection with said arms.

FRANK L. LANGHAMMER.